INVENTOR
RONALD JOHN ELGER
BY Hammond + Littell
ATTORNEYS

Jan. 11, 1966  R. J. ELGER  3,228,226
MULTI-CONTAINER EXTRUSION PRESS
Filed Jan. 8, 1963  4 Sheets-Sheet 3
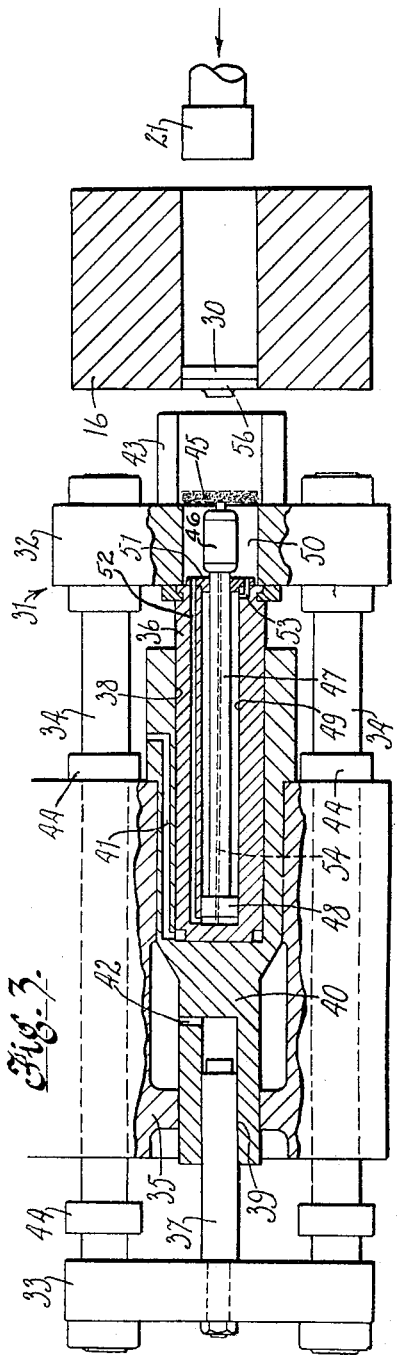
INVENTOR
RONALD JOHN ELGER
BY
Hammond & Littell
ATTORNEYS Jan. 11, 1966    R. J. ELGER    3,228,226
MULTI-CONTAINER EXTRUSION PRESS
Filed Jan. 8, 1963    4 Sheets-Sheet 4
Station A
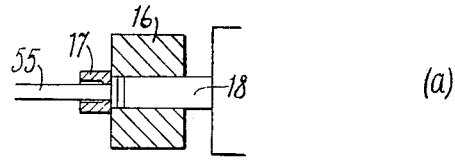 (a)
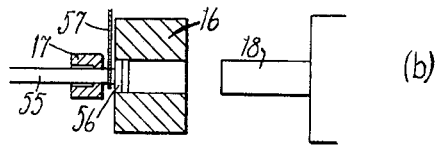 (b)
*Fig.5*
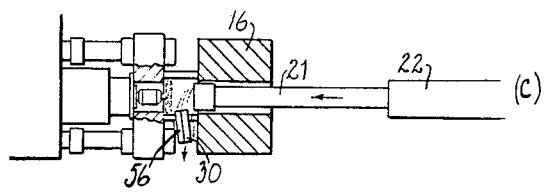 (c)
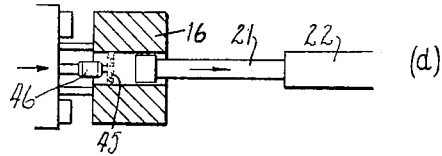 (d)
Station B
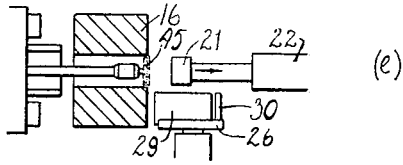 (e)
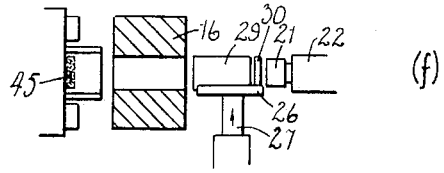 (f)
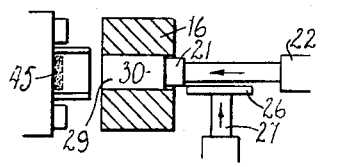 (g)
INVENTOR
RONALD JOHN ELGER
BY
Hammond & Littell
ATTORNEYS United States Patent Office 3,228,226
Patented Jan. 11, 1966

3,228,226
MULTI-CONTAINER EXTRUSION PRESS
Ronald John Elger, Parkstone, England, assignor to The Loewy Engineering Company Limited, Bournemouth, England, a corporation of Great Britain
Filed Jan. 8, 1963, Ser. No. 250,155
Claims priority, application Great Britain, Jan. 9, 1962, 793/62
6 Claims. (Cl. 72—263)

The present invention relates to multi-container extrusion presses.

In such presses, the containers are usually mounted on a carrier movable into a plurality of positions in each of which a separate one of the containers is in a working station in the extrusion axis of the press, and the other container or containers are in parking stations offset from the extrusion axis. The carrier may be rotatably mounted on the frame of the press about an axis parallel to the extrusion axis, or, alternatively, the carrier may be slidably mounted on the press for translational movement across the extrusion axis.

In operation, a billet and a pressing disc are loaded into the bore of a container in a parking station, and the carrier moved into a position in which the loaded container is in the working station. The billet is then extruded through a die by means of a pressing stem forced into the container bore by a hydraulic unit. For reasons which are well known, it is not possible to extrude the whole of a billet, and a discard consisting of the unextruded portion of the billet and the pressing disc remains in the container bore after the extrusion operation. The extruded product is severed from the discard, usually by means of a saw, and, after withdrawal of the stem from the container bore, the carrier is moved into a position in which the container having the discard is located in a parking station, and another container loaded with a billet and a pressing disc is located in the working station. The discard is then ejected from the bore of the container in the parking station, and the bore cleaned, cooled if necessary, and charged with a fresh billet and pressing disc. The container bore may be cleaned by a blast of air or by flushing with water, the air or water also serving to cool the container. The discard ejection, cleaning and re-loading of each container is carried out during extrusion operations with the other container or containers. In this way, the time between successive extrusion operations is reduced, and the output of the press correspondingly increased.

With a press having three or more containers, at least two of the ancillary operations of discard ejection, cleaning and re-loading of a container may be effected at two different parking stations.

The above-mentioned ancillary operations are performed by mechanical devices, each of which comprises a working implement which is advanced into and withdrawn from the bore of a container in a parking station. The aggregate of the times required for each of these ancillary operations is more than the time required to extrude a billet from a container, and even with a three-container press may be more than the aggregate time required to extrude billets from two containers. This is particularly the case in the extrusion of steel and certain other metals in which a lubricant is applied to the billet and to the surface of the container bore. It is then necessary to remove any residual lubricant from the container bore after each extrusion, and such residual lubricant is removed by a cleaning head having a scraper or rotating brush which is passed through the container bore. This takes additional time.

The object of the invention is to provide an improved method of operating a multi-container extrusion press in which the period of time required for carrying out ancillary operations on each container is materially reduced, and to provide a multi-container extrusion press having an improved arrangement of mechanical devices for carrying out such ancillary operations.

According to the invention there is provided a method of operating an extrusion press having at least two billet containers movable between a working station in the extrusion axis of the press and parking station offset from this axis, wherein the ancillary operations of discard-ejection and cleaning of a container are carried out at a single parking station by mechanical devices arranged at opposite ends of the container, each device including a working implement adapted to be advanced into and withdrawn from the bore of the container to effect the ancillary operation, and wherein at least part of the advance stroke of the implement of the cleaning device is effected simultaneously with at least part of the withdrawal stroke of the implement of the discard-ejecting device.

According to the invention there is further provided a metal extrusion press having at least two billet containers movable between a working station in the extrusion axis of the press and a parking station offset from this axis, and two mechanical devices for effecting the ancillary operations of discard-ejection and cleaning of a container, wherein the two devices are arranged at opposite ends of the container in a parking station and each device includes a working implement adapted to be advanced into and withdrawn from the bore of the container to effect its ancillary operation, whereby at least part of the advance stroke of the implement of the cleaning device can be effected simultaneously with at least part of the withdrawal stroke of the implement of the discard-ejecting device.

The implement of the device for cleaning and the container preferably comprises a rotary brush driven by a fluid-operated motor, the fluid discharged from the motor during cleaning operations serving to cool the container bore. The working fluid for the motor can conveniently be supplied from one of the working cylinders of a piston and cylinder unit for reciprocating the brush.

The device for cleaning the container is preferably mounted on a reaction frame adapted to withstand the force exerted on the container during discard ejection. The reaction frame may comprise a crosshead having gag members arranged to engage the container during discard ejection, the crosshead having a central aperture accommodating the cleaning device during the advance stroke of the discard-ejecting device.

A preferred construction of a twin-container metal extrusion press according to the invention, and the operation thereof, will now be described by way of example with reference to the accompanying drawings, in which:

FIG. 3 is a sectional view, on an enlarged scale, of the container cleaning device built into the discard-ejection reaction frame of the press, the reaction frame being shown at the rear of a container in the parking station B. This view is along the line III—III of FIG. 1.

FIG. 5 illustrates diagrammatically the sequence of operations at the working station A and the parking station B.

Figure 1:
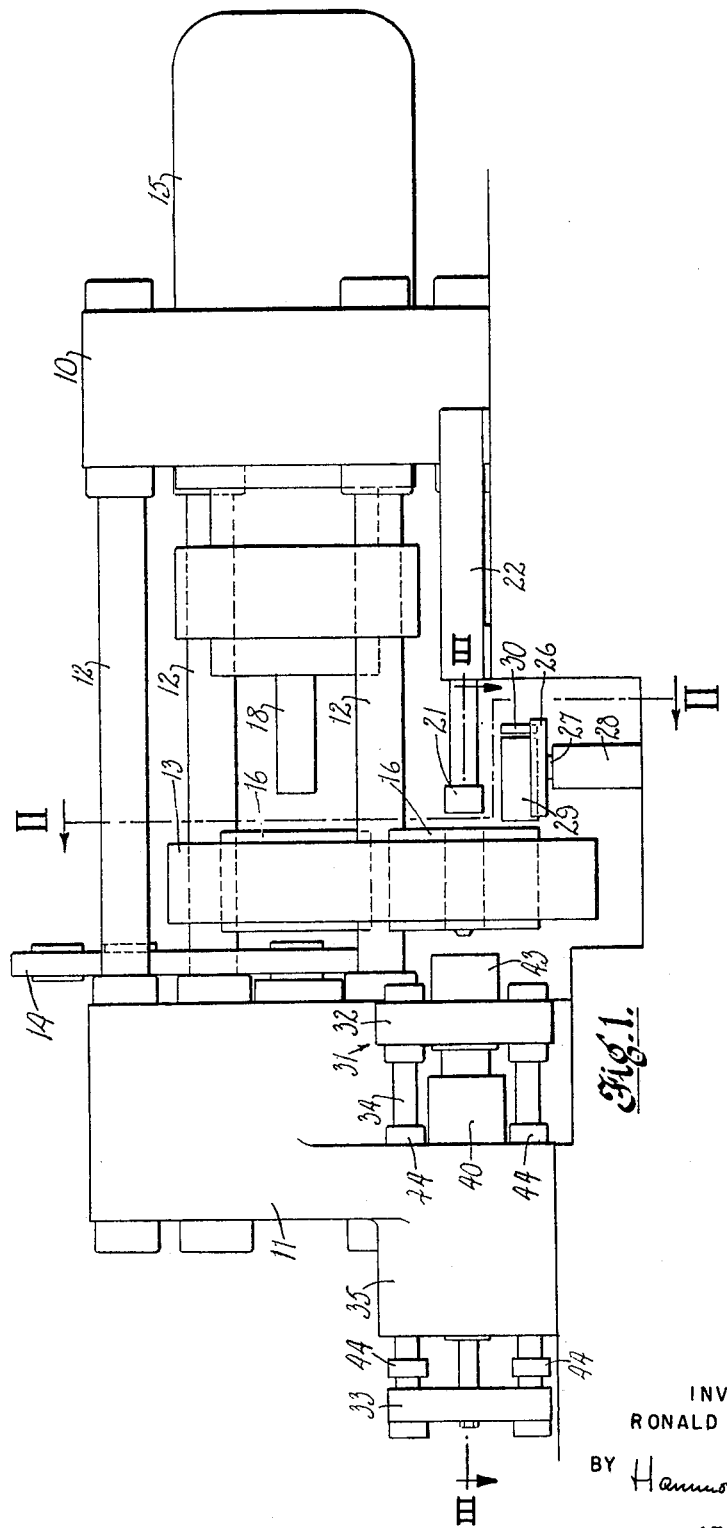
FIG. 1 is an elevation view of the press.
Figure 2:
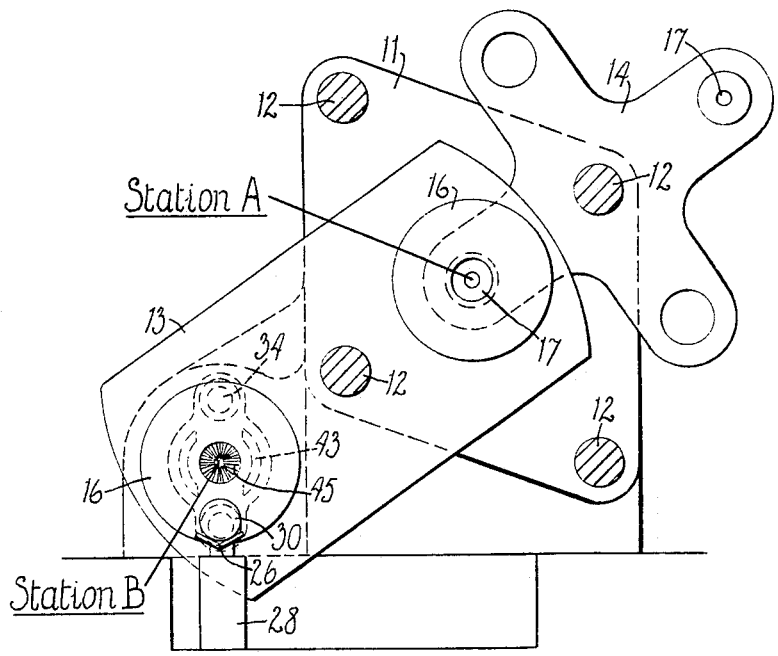
FIG. 2 is a view along the line II—II of FIG. 1, showing a working station A and a parking station B.
Figure 4:
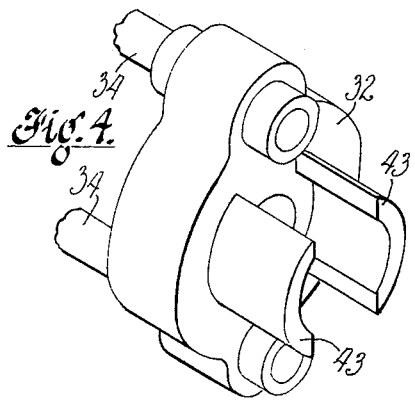
FIG. 4 is an isometric view of the front end of the reaction frame.

Referring to FIGS. 1 and 2, the press comprises a front platen 10 and a rear platen 11 interconnected by four tension columns 12, a container carrier 13 and a die carrier 14, each rotatably mounted on two separate columns 12 on opposite sides of the centre line of the press, and a main hydraulic unit 15. The container carrier 13 supports two containers 16 and is movable to transfer each container in succession from a working station A in the centre line of the press to a parking station B offset from the centre line of the press, and vice versa. The die carrier 14 supports two dies 17 and is movable to transfer each die in succession from the working station A to a further parking station outside the press and vice versa. The main hydraulic unit 15 is arranged to force a stem 18 into the bore of a container 16 in the working station and extrude a metal billet in the container through a die 17 in the working station A.

A discard-ejecting and billet loading device is arranged at the front of the parking station B and comprises a ram 21 connected to the piston of a double-acting piston and cylinder unit 22. The ram 21 is aligned with the bore of a container in the parking station and the hydraulic unit 22 is operable to advance the ram through the container bore from the front end thereof, and then subsequently withdraw the ram from the container bore.

A billet loading unit is mounted on the base of the press between the container carrier and the discard-ejecting and loading device, and comprises a loading tray 26 mounted on the upper end of a lifting ram 27 driven by a hydraulic cylinder 28. The loading tray 26 is movable by the ram 27 between a lower position in which a billet 29 and a pressing disc 30 on the tray are below the ram 21 of the discard-ejecting and billet loading device, and an upper position in which the billet and pressing disc are co-axial with ram 21 and the bore of the container in the parking station B. The billet and pressing disc are fed on to the tray when in its lower position by conventional conveyor means not shown in the drawing.

A reaction frame 31 for withstanding the force exerted on the container during discard-ejection, is arranged at the rear of the parking station B FIG. 3. The frame 31 comprises front and rear crossheads 32, 33 interconnected by two tie-rods 34 which are slidably mounted in bores in a sub-platen 35 formed integral with the rear platen 11. The crossheads 32, 33 are secured to plungers 36, 37 slidably mounted in cylinders 38, 39 respectively, formed in a cylinder block 40 which is secured in an opening in the sub-platen 35. The block 40 is formed with a duct 41 for supplying liquid under pressure to the cylinder 38 to move the frame forward towards a container in the parking station B, and the block 40 is formed with a further duct 42 for supplying liquid under pressure to the cylinder 39 to move the frame rearwards away from the container. Two arcuate gag-plates 43 on the front crosshead 32 are arranged to engage the rear end of a container in the parking station upon forward movement of the frame 31, the two gag-plates having a length greater than the discard to be ejected from the container and being spaced apart from each other a distance sufficient to permit a discard ejected from the container to fall downwards into a receiving tray, not shown. Screw nuts 44 on the tie-rods 34 engage the sub-platen 35 and act as stops for limiting the forward and rearward movement of the frame 31.

A container cleaner device is mounted on the reaction frame 31 and comprises a rotary brush 45 driven by an air-operated motor 46 supported on the front of a rod 47. The rear of the rod 47 is formed with a double-acting piston 48 which is slidably mounted in a cylinder 49 formed in the front plunger 36 of the reaction frame 31. The front crosshead 32 is formed with an aperture 50 coaxial with the cylinder 49, and the front of the cylinder 49 is closed by an end-plate 51 having a central aperture for the passage of the rod 47. The plunger 36 is formed with a duct 52 for supply of air under pressure to the rear end of cylinder 49, and with a duct 53 for supply of air under pressure to the front of cylinder 49. The rod 47 is formed with a central duct 54 for supply of air under pressure to the air-operated motor 46, the duct 54 opening through the rear end of the rod 47. The cylinder 49 is aligned with the bore of the container in the parking position, so that the brush may be advanced into and withdrawn from the container bore by supply of air to the rear or front respectively of the cylinder 49. During advance of the brush, part of the air supplied through duct 52 to the rear end of the cylinder 49 passes through the duct 54 in the rod 47 and drives the motor and brush. The aperture 50 in the front crosshead 32 accommodates the motor 46 when the cleaning device is in its inoperative position.

Diagrams (*a*) to (*g*) inclusive in FIG. 5 show the sequence of operations performed on the billet and container at the working station A and the parking station B.

In FIG. 5(*a*) the billet has been extruded through the die 17 by the stem 18 to form the extruded product 55. The container 16 is then retracted from the die 17 as shown in FIG. 5(*b*), and the extruded product 55 is separated from the discard 56 by a saw entered between the container 16 and die 17. The container carrier is then rotated to transfer the used container into the parking station B to effect the ancillary operations of discard-ejection, cleaning and re-loading of the container preparatory to a further extrusion operation.

Immediately the used container is in register with the parking station B, liquid under pressure is supplied to the cylinder 38 in order to move the reaction frame 31 forward and engage the gag-plates 43 against the rear end of the container. The ram 21 of the discard-ejecting and loading device is then advanced into the bore of the container and ejects the discard 56 together with the pressing disc 30 through the rear end of the container, as shown in FIG. 5(*c*). The reaction on the container due to the force exerted on the discard by the ram 21 is transmitted through the gag-plates 43 to the reaction frame 31. The discard and pressing disc then fall down between the two gag-plates into the receiving tray (not shown), and the ram 21 is withdrawn from the container bore.

During the withdrawal movement of the ram 21, air under pressure is fed through the duct 52 to the rear of the cylinder 49 in order to advance the brush into the container bore and follow up the movement of the ram 21, as shown in FIGS. 5(*d*) and (*e*). During the advance movement of the brush, air from the cylinder 49 flows through the duct 54 and drives the motor and brush. The rotary brush scours the walls of the container bore, thereby removing any deposit formed thereon during the extrusion operation, and the air discharged from the motor 46 impinges on walls of the bore and thereby cools the container.

If it is desired to cool and flush out the container bore with liquid, the motor 46 may of course be driven by liquid under pressure fed through the duct 54 from cylinder 49, the liquid being discharged into the container bore.

The brush is then retracted from the container bore by supply of air under pressure to the front of cylinder 49, and the loading tray 26 supporting a fresh billet and pressing disc is raised into its upper position, with the billet aligned with the container bore, as shown in FIG. 5(*f*). The ram 21 is then advanced, FIG. 5(*g*), to charge the fresh billet and pressing disc into the container bore, and the carrier is rotated to move the loaded container into station A.

The operations on the container at station A, as shown at (*a*) and (*b*) in FIG. 5, are carried out during the period taken by the operations on the container at station B, as shown at (*c*) to (*g*) in FIG. 5. Since the advance movement of the brush takes place during the withdrawal movement of the ram 21, immediately after ejection of the discard, the overall period of time required to perform the ancillary operations of discard ejection and cleaning is appreciably less than the aggregate of the periods of time required to perform each of these ancillary operations.

The period of time between successive extrusion operations with the press of the present invention is therefore less than that with the conventional arrangement of press in which all the ancillary operations are performed consecutively from one end of a container in a parking station.

What we claim is:

1. A metal extrusion press having at least two billet containers which can interchange their positions between the working station in the extrusion axis of the press and a parking station laterally offset from said press, discard-ejecting means adapted to enter a container in the parking station at one end thereof, and cleaning means adapted to enter the container at the opposite end, and a reaction frame movable into engagement with that end of the container from which the discard is ejected, said cleaning means being mounted in said reaction frame.

2. A metal extrusion press as claimed in claim 1, wherein said reaction frame is in engagement with said container by gag members which are spaced apart from each other by an opening for the passage therethrough of the discard and of said cleaning means.

3. A metal extrusion press as claimed in claim 1, wherein the reaction frame comprises a block slidable in the direction of the axis of the container at the parking station with a hydraulic motor at each end of said block for moving said block in opposite directions.

4. A metal extrusion press as claimed in claim 3, comprising in addition a rotary fluid pressure motor for the brush, said motor being fed with pressure fluid from the same source as the reciprocating means for the brush.

5. A metal extrusion press as claimed in claim 1, wherein the cleaning means comprise a brush and reciprocating fluid pressure means for effecting displacement of said brush in the direction of the axis of the container at the parking station, said fluid pressure means being built into a block slidably mounted in the reaction frame.

6. The method of extrusion in an extrusion press having at least two billet containers which can interchange their positions between a working station in the extrusion axis of the press and a parking station laterally offset from the extrusion axis of the press, which comprises extruding a billet from a container in the extrusion axis of the press, and when the extrusion is finished, moving said container to a parking station, ejecting the discard from said container and cleaning said container wherein a discard-ejecting device and a cleaning device are caused to enter a container in the parking station in succession at opposite ends of said container, and in which at least part of the advance stroke of the cleaning device is effected simultaneously with at least part of the return stroke of the discard-ejecting device, loading a billet into said container in a parking station, and simultaneously extruding a billet from another container while the first container is in a parking station.

References Cited by the Examiner

UNITED STATES PATENTS

| 2,985,320 | 5/1961 | Kent | 207—1.1 |
| 3,083,827 | 4/1963 | Rosenthal | 207—15 |

FOREIGN PATENTS

| 233,072 | 1/1962 | Australia. |
| 1,163,770 | 4/1958 | France. |
| 1,130,786 | 5/1961 | Germany. |

CHARLES W. LANHAM, *Primary Examiner.*

MICHAEL V. BRINDISI, *Examiner.*